Feb. 23, 1926.
W. T. BURTIS
1,574,603
CESSPOOL
Filed Oct. 3, 1924
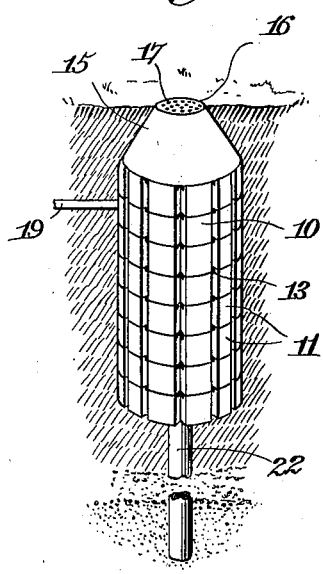
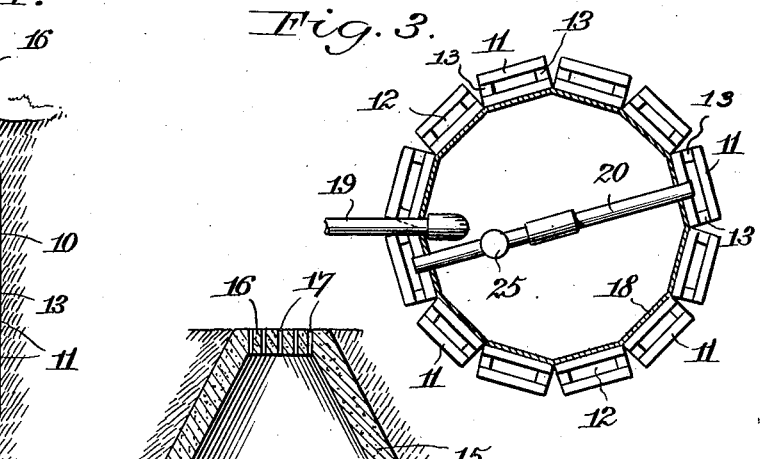
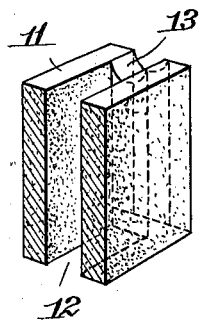
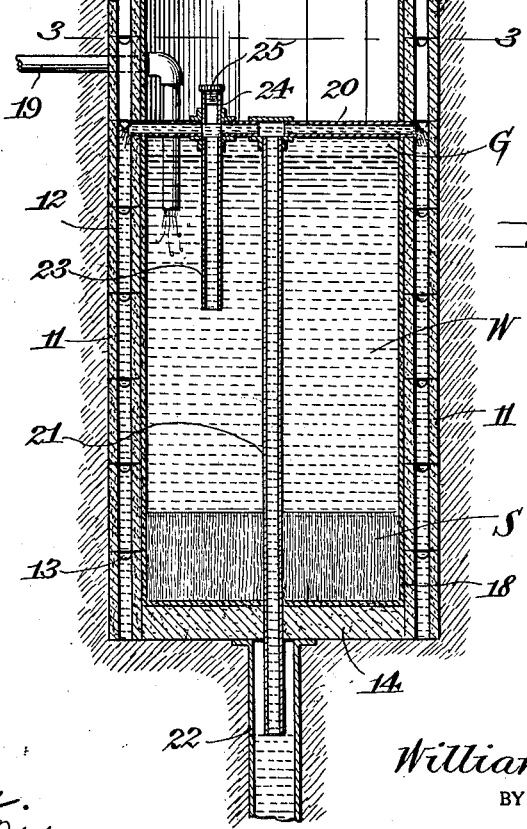
WITNESSES:
Cris Feinle.
Hugh H. Ott
INVENTOR,
William T. Burtis.
BY
ATTORNEYS.

Patented Feb. 23, 1926.

1,574,603

UNITED STATES PATENT OFFICE.

WILLIAM THOMAS BURTIS, OF GLEN HEAD, NEW YORK.

CESSPOOL.

Application filed October 3, 1924. Serial No. 741,507.

*To all whom it may concern:*

Be it known that I, WILLIAM T. BURTIS, a citizen of the United States, and a resident of Glen Head, in the county of Nassau and State of New York, have invented a new and Improved Cesspool, of which the following is a full, clear, and exact description.

This invention relates to sewerage systems and has particular reference to a filter bed for the final disposal of waste water and residue of cesspools, the same being in the nature of an improvement over my prior United States Patent No. 1,454,723 granted May 8, 1923.

In practice close observation has revealed the fact that three stratas are always found in any tank for sewage disposal, namely a layer of solid matter at the bottom, a layer of grease at the top and a body of water between said layers. It is therefore an object of the present invention to remove and discharge the water which is employed as a vehicle or carrying agent for the solid matter for removing the water constituting the central body which collects in the filter bed so that the pipe or conduit which performs this function can never become clogged either by the grease layer floating on top of the water or the solid matter which gravitates to the bottom.

As a further object the invention comprehends a tank or filter bed including a specially constructed wall with which the outlet pipe for carrying off the water communicates to permit said water to seep into the surrounding soil in which the tank or filter bed is buried.

The invention furthermore comprehends in connection with a filter bed or final disposal tank for a sewage disposal system, a second outlet pipe or conduit which leads through the center of the bottom of the tank to a lower level or strata of soil to carry off the water.

As a further object the invention contemplates a filter bed or tank for the final disposal of waste water and residue from cesspools and grease traps which functions to constantly dispose of the small amount of grease and solid matter which finds its way into said filter bed by means of the natural microbic action and which therefore eliminates the necessity of cleaning out the grease and solid matter.

With the above recited and other objects in view, the invention resides in the novel construction set forth in the following specification, particularly pointed out in the appended claim and illustrated in the accompanying drawings, it being understood that the right is reserved to embodiments other than those actually illustrated herein, to the full extent indicated by the general meaning of the terms in which the claims are expressed.

In the drawings—

Figure 1 is a perspective view illustrating the filter bed or final disposal tank of a sewage disposal system;

Figure 2 is an enlarged vertical sectional view therethrough;

Figure 3 is a horizontal sectional view taken approximately on the line indicated at 3—3 in Figure 2; and Figure 4 is a fragmentary perspective sectional view through one of the blocks constituting the wall structure of the filter bed or tank.

Referring to the drawings by characters of reference 10 designates a substantially hollow cylindrical body or tank the side walls of which are composed of a plurality of super-posed blocks 11 each of which is provided with a vertical central opening 12 and substantially arcuate recesses 13 at the top of its end walls which communicate with the central opening 12. The tank or body 10 is further provided with a closed bottom wall 14 and a substantially frusto-conical cover or cap 15 the truncated upper portion 16 of which is provided with vertical apertures or vent openings 17. The side walls and bottom of the tank are lined with a suitable film or layer of cementitious material 18 which is impervious to water. A conduit pipe 19 leads from the cesspool system such as the grease trap and the septic or liquefying tanks and empties the water and other residue into the filter bed or tank 10. As illustrated in Figure 2, W indicates the water, S the solid matter which gravitates to the lower end and G the grease which floats upon the top of the water. The filter bed is provided with a cross pipe 20 the opposite ends of which extend through the inner lining 18 and communicate with the central openings 12 of the blocks 11 through which they extend. A vertical pipe or conduit 21 communicates with the pipe 20 and extends centrally downward through the tank or body 10 and through the lining 18 and the bottom wall 14 where it enters a downwardly extending receiving pipe 22. The cross pipe 20 is further provided with a depending branch pipe 23 which communicates therewith and has its lower open end extending approximately to the center of the body of water 12. An upwardly projecting nozzle 24 located diametrically opposite the pipe 23 communicates with the pipe 20 and is closed at its upper end by a removable screw plug 25.

In use and operation of the filter bed the water and other residue from the septic or liquefying tank and the grease trap is introduced to the body 10 through the pipe 19. Immediately this water and residue separates the solid matter S gravitating to the bottom of the tank with the body of water thereabove and with the grease layer floating upon the water. As the residue enters and assumes a predetermined level the water overflows through the pipe 23 the pipe 20 and the pipes 21 and 22. The overflow from the outer ends of the pipe 20 which communicates with the vertical openings 12 in the blocks 11 is carried off through the arcuate recess 13 and through the separated ends of the blocks 11 where it seeps into the surrounding soil. Some of the water from the pipe 20 overflows and descends through the pipe 21 where it is discharged into the pipe 22 and thence conveyed to the lower stratas of soil where it is finally disposed of.

After a period of about three months microbic action sets in, through which action the solid matter S is continuously being consumed thereby preventing it from ever rising to a height where it will clog or otherwise interfere with the lower open end of the pipe 23. The grease layer G at the top of the water body W is filled with aerobic bacteria (bacteria that can not live without air) which also serves as a cover for shutting off light and air and thus protecting the active anaerobic bacteria (bacteria that can not live where there is light and air) which are at work in solid matter at the bottom of the tank. This method of construction therefore takes advantage of nature which results in a continuous action and enables the filter bed or final disposal tank to function continuously without attention or the use of chemicals. The nozzle 24 and removable screw plug 25 is provided for the purpose of cleaning out or freeing the pipe 23 of the collection of any extraneous matter and at extremely long periods of time the cover 15 may be removed for gaining access to the interior of the tank to effect repairs.

I claim:

A final disposal tank for the contents of cesspools including an approximately cylindrical receptacle into which said contents are adapted to be discharged, said receptacle having its side walls constructed of vertical rows of communicating hollow blocks, the rows of blocks defining V shaped vertical drain channels at the junction of the rows, the rows also including internal vertical drain channels open at their ends to the soil and communicating thru lateral openings with the V shaped drain channels, and means for drawing off water from the tank including pipes communicating with the internal channels.

WILLIAM THOMAS BURTIS.